United States Patent
Brink et al.

(10) Patent No.: US 6,547,907 B1
(45) Date of Patent: Apr. 15, 2003

(54) METHOD FOR PRODUCING A ROTATIONALLY SYMMETRIC BODY

(75) Inventors: Burkhard Brink, Rosengarten (DE); Hans-Werner Friederich, Winsen (DE); Wolfgang Meyer, Buchholz (DE)

(73) Assignee: Phoenix Aktiengesellschaft, Hamburg (DE)

( * ) Notice: Subject to any disclaimer, the term of this patent is extended or adjusted under 35 U.S.C. 154(b) by 0 days.

(21) Appl. No.: 09/530,338

(22) PCT Filed: Oct. 14, 1998

(86) PCT No.: PCT/DE98/03015

§ 371 (c)(1),
(2), (4) Date: Apr. 28, 2000

(87) PCT Pub. No.: WO99/22929

PCT Pub. Date: May 14, 1999

(30) Foreign Application Priority Data

Oct. 31, 1997 (DE) .......................... 197 48 060

(51) Int. Cl.$^7$ .............................................. B29C 53/80
(52) U.S. Cl. .................. 156/149; 156/173; 156/244.13; 156/331.7
(58) Field of Search ............................ 156/244.13, 172, 156/169, 173, 175, 195, 171, 149, 143; 264/209.2, DIG. 57

(56) References Cited

U.S. PATENT DOCUMENTS

| | | | | |
|---|---|---|---|---|
| 3,607,501 A | * | 9/1971 | Okumura | 156/143 |
| 4,007,070 A | * | 2/1977 | Busdiecker | 156/143 |
| 4,319,944 A | * | 3/1982 | Pope | 156/195 |
| 4,758,397 A | * | 7/1988 | Schreiner et al. | 156/244.13 |
| 5,668,223 A | * | 9/1997 | Tadokoro et al. | 525/440 |
| 5,722,794 A | * | 3/1998 | Freiderich et al. | 405/171 |

FOREIGN PATENT DOCUMENTS

| | | |
|---|---|---|
| DE | 33 33 522 | 4/1985 |
| DE | 34 21 364 | 12/1985 |
| EP | 036 184 | 3/1981 |
| EP | 184 759 | 3/1985 |
| GB | 2 250 934 | 6/1992 |
| WO | WO 92/09507 | 6/1992 |
| WO | WO 96/01385 | 1/1996 |

\* cited by examiner

Primary Examiner—Michael W. Ball
Assistant Examiner—Todd J. Kilkenny
(74) Attorney, Agent, or Firm—Collard & Roe, P.C.

(57) ABSTRACT

The invention relates to a method for producing a rotationally symmetric body, especially a hose, specifically a large hose, by utilizing a rotating core as a supporting body for the inner layer; a device for storing and guiding the thread, the device being able to move back and forth in a parallel manner relative to the rotating core; and a molding head which can also move back and forth in a parallel manner relative to the rotating core and in which at least two reactive liquid or pasty components for the reaction are brought. The inner layer and the outer layer are constructed by means of the reaction mixture which exits the molding head. In addition, the thread is saturated with the reaction mixture during the production of the strength supporter, whereby the incorporation of the thread results during a reaction degree of no more than 50%. Useful method parameters are introduced.

9 Claims, 2 Drawing Sheets

METHOD FOR PRODUCING A ROTATIONALLY SYMMETRIC BODY

DESCRIPTION

The invention relates to a method for producing a rotationally symmetric body, especially a hose, specifically a large hose comprising at least one inner layer made of elastomeric material;

a strength supporter in the form of several layers of plies of threads applied to the inner layer, whereby the threads within a ply of threads are arranged substantially parallel relative to each other, and whereby a through-extending thread running around the rotationally symmetric body back and forth in the form of a steep helix forms a plurality of layers of thread plies with a crossed arrangement from ply to ply; as well as an outer layer made of elastomeric material, said outer layer covering the strength supporter;

with the use of a rotating core as a supporting body for the inner layer, as well as a device capable of moving back and forth back and forth parallel relative to the rotating core for storing and guiding the thread, said device preferably being in the form of a winding device for forming the strength supporter (DE-A-33 33 522); as well a molding head also movable back and forth parallel in relation to the rotating core, with which at least two reactive liquid or pasty components are reacted, whereby said reaction mixture is then applied to a chemical compound as it is completing its reaction to a chemical compound, namely with formation of the inner layer and the outer layer, and whereby the thread runs into the reaction mixture as the strength supporter is being produced (DE-A-34 21 364; EP-A-0036 184).

A method of substantially said type is known from German laid-open patent specification 33 33 522, whereby in particular large hoses are produced by said method, said hoses being provided with a connecting element on each of their two ends.

Now, according to the method according to DE-A 33 33 522, the thread is advantageously applied to the rotating hose blank by means of an electronically controlled coiling device. In this process, the thread continuously runs back and forth across the inner rubber layer of the hose, in a way such that thread is placed next to thread. As soon as the thread has run across the annular bead, the guidance stops in the respective position for part of the rotation of the hose blank.

Said threads may be cord threads, braids or thin ropes. The term "threads" also includes mono- and multi-filament threads. Synthetic fibers such as nylon, polyester or aramide fibers can be employed as material for said threads, and also material such as steel and other materials commonly used in hoses. The material and the construction of the thread are determined by the given case of application.

As soon as the coiling of the thread has been completed, the outer rubber layer of the hose is applied, and vulcanization is carried subsequently.

Furthermore, a method for producing oblong hollow bodies (for example hoses) is known from German laid-open patent specification 34 21 364, namely with the use of a rotating core. Four roller bocks are associated with said core, from which webs of a release foil (for example polyester foil) run off from supply rolls, said webs overlapping each other. Now, a liquid material such as a reaction mixture or a melt is applied to the release foil by means of a plurality of molding heads, namely in particular with incorporation of a web of fabric serving as the strength supporter. Final vulcanization is omitted in connection with said method.

Now, the problem of the invention is to further develop a method of the type specified above for producing a rotationally symmetric body, in particular a hose, specifically a large hose, in a way such that safe incorporation of the thread forming the strength supporter in an abrasion-resistant elastomeric material is assured, whereby the vulcanization is omitted. Most of all, large heavy duty hoses are to be capable of being manufactured by the method as defined by the invention under the economical aspect.

Said problem is solved according to the characterizing part of claim 12 in that the incorporation of the thread takes place at a degree of reaction of not more than 50% namely based on the start of the mixing process in the molding head, whereby, furthermore, during the incorporation of the thread, either a molding head is employed which, as a separate component of the machine, moves synchronously to the thread device, whereby the thread is guided directly above the molding head, whereby the thread first runs up dry on the inner layer and is only then incorporated in the reaction mixture; or a molding head with integrated thread guidance is used.

Useful variations of the method are specified in claims 2 to 9.

The invention is now explained with the help of exemplified embodiments and by reference to schematic drawings, in which.

Figure 1:
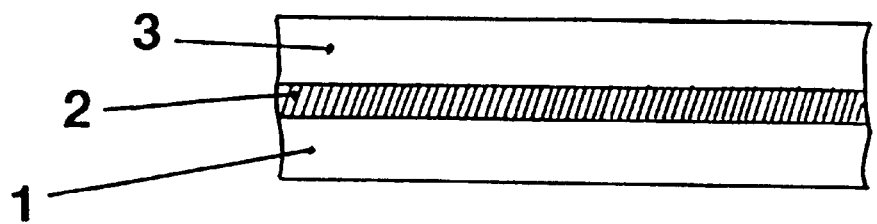
FIG. 1 shows the basic structure of a hose wall longitudinal section).

The following list of reference symbols is applicable in connection with said figures:

1 Inner layer made of elastomeric material
2 Strength supporter
3 Outer layer made of elastomeric material
4 Rotating core in the form of a mandrel
4' Rotating core in the form of a floating hose with buoyant body
5 Device (winding device) for storing and guiding the thread (only the eye of the thread is shown here as part of the device).
6 Thread
7 Run-up position of the thread on the inner layer
8 Molding head
9 Mixing position of the components (A,B) in the Molding head
10 Outlet opening (nozzle) of the molding head
11 Floating hose
12 Steel socket
13 Buoyant body
14 Outer skin A Reactive component, preferably polyol
B Reactive component, preferably polyisocyanate
C Reaction product, preferably polyurethane
D Inside diameter of the floating hose
X Axis of rotation of the rotating core
H Total height of the rotating core
H' Upper one-third range of the rotating core.

Figure 2:
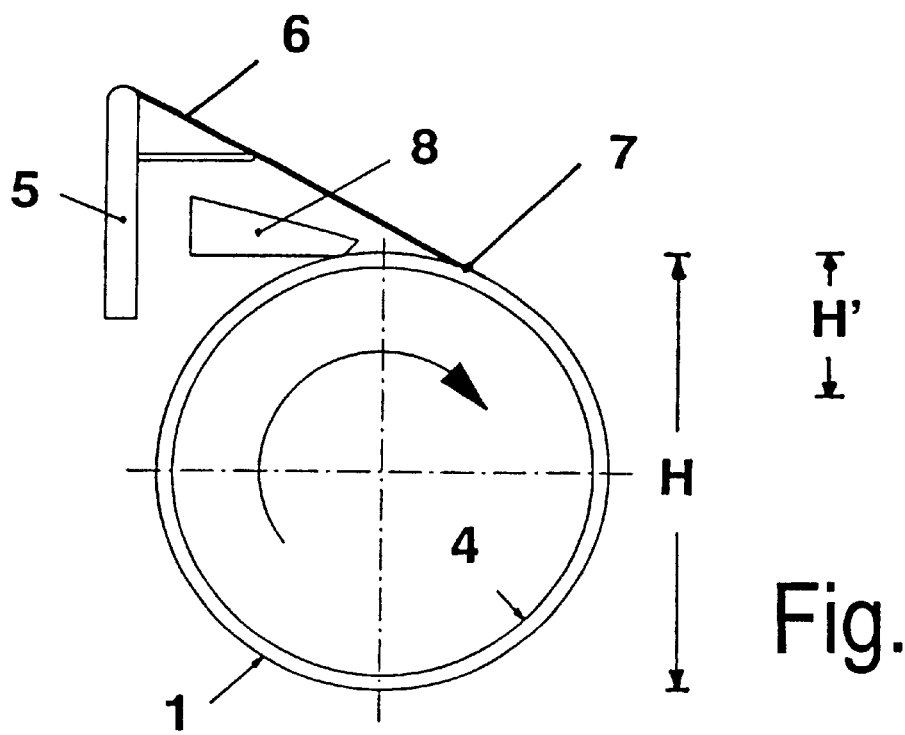
FIG. 2 shows the flow diagram of the process utilizing a rotating mandrel, a winding device and a molding head (cross section).

According to FIG. 1, the hose wall consists of an inner layer 1 made of elastomeric material, a strength supporter 2 in the form of several layers of plies of thread applied to the inner layer with a crossed arrangement from layer to layer at an angle of preferably 40° to 80° (DE-A-33 33 522; FIG. 2), as well as an outer layer 3 made of elastomeric material.

FIG. 2 shows a rotating core 4 in the form of a mandrel rotating in the direction indicated by the arrow. The mandrel is at the same time the supporting body for the inner layer 1, which is preferably applied in the form of a butt-jointed coil.

By means of a device 5 which is movable back and forth parallel relative to the rotating mandrel, said device being in the form of a winding device, the thread 5 is now permitted to first run up dry on the inner layer 1. Only in the run-up position 7, the thread 6 is then incorporated in the reaction mixture, which is formed in the molding head 8 (also referred to as a mixing head).

Figure 3:
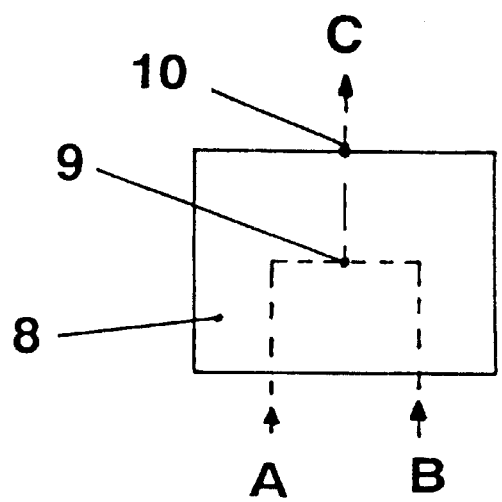
FIG. 3 shows a diagram of the reaction within the molding head.

The molding head 8 is movable back and forth parallel with the rotating mandrel as well. A molding head is employed in the present case which, as a separate component of the machine, moves synchronously with the thread winding device 5, whereby the thread 6 is guided directly above the molding head 8, preferably above its outlet opening 10 (FIG. 3). The outlet opening of the molding head is arranged in such a way that the reaction mixture is applied within the upper one-third range H' of the rotating core 4 based on its total height H.

Now, FIG. 3 shows again the molding head 8, where the two reactive components A and B are mixed in position 9. The reaction mixture exits from the molding head at the outlet opening 10.

The complete reaction of the reaction mixture to a chemical compound C takes place rapidly, whereby the maximum reaction time amounts to four minutes depending on the type of components used. The reaction is substantially completed after only 60 seconds in most cases. It is important in this connection that the incorporation of the thread 6 (FIG. 2) takes place at a degree of reaction of not more than 50%, in particular of not more than 35% based on the start of the mixing process in the molding head (position 9).

A multitude of substances are available for the components A and B. It is important in this connection that the reaction product C has both elastic and abrasion-resistant properties, usefully based on polyurethane.

In the exemplified embodiment according to FIG. 2, the thread-guiding device 5 and the molding head 6 are designed as separate machine components. As an alternative it is possible also to employ for the incorporation of the thread 6 a molding head with integrated thread guidance. Referring to FIG. 3, the thread is then impregnated either in the zone between the mixing position 9 and the outlet opening 10, or outside of the outlet opening.

Irrespective of the variations of thread guidance described herein, the outer layer 3 (FIG. 1) is applied as soon as the strength supporter 2 has been formed, namely again advantageously in the form of a butt-jointed spiral as in connection with the inner layer 1.

According to the method as defined by the invention, it is possible to incorporate steel sockets or other connecting elements in the two ends of the hose.

In order to facilitate the removal of the mandrel after the hose has been completed, a release layer in the form of a foil or wax or the like is applied to the mandrel 4 before the inner layer 1 is produced.

Figure 4:
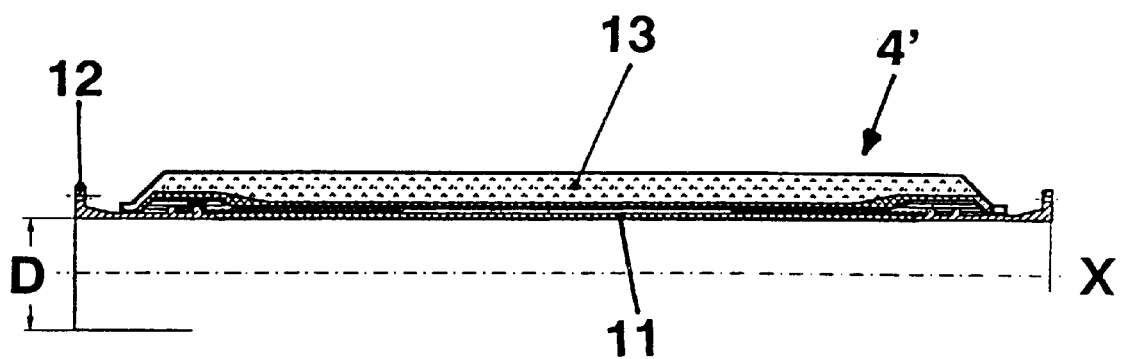
FIG. 4 shows a floating hose with a buoyant body as the rotating core (longitudinal section).

According to FIG. 4, the rotating core 4' with the axis of rotation X is a floating hose 11 with the inside diameter D. Said hose is provided with the incorporated steel sockets 12 at both ends, as well as with a buoyant body 13 made of foam. The buoyant body is covered with an outer skin in most cases. Such a floating hose is described, for example in the international patent application with publication number WO 96/01385.

Figure 5:
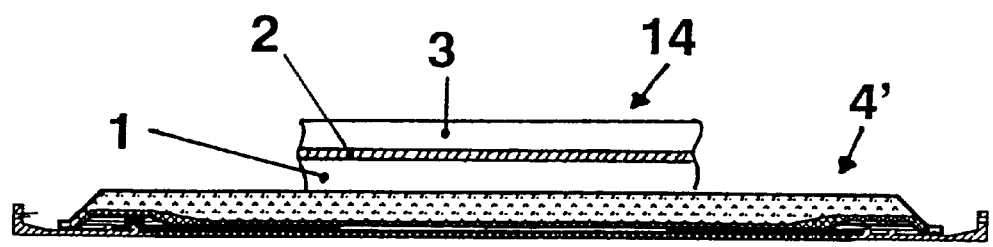
FIG. 5 shows a floating hose with a buoyant body and the outer skin (longitudinal section).

Now, FIG. 5 shows the core 4' with the outer skin 14, comprising an inner layer 1, a strength supporter 2, as well as an outer layer 3, thus a basic structure according to FIG. 1. The outer skin is shown here greatly enlarged in order to illustrate the layer structure as compared to the core 4', which, as opposed to the mandrel 4 (FIG. 2), is here an important part of the final product.

The outer skin 14 itself, however, is produced also in this case by the method according to any one of claims 1 to 5, 8 and 9.

What is claimed is:

1. A method for producing a rotationally symmetric body comprising the steps of;
   i) supporting and rotating an inner layer of the body made of elastomeric material on a rotating core;
   ii) guiding thread onto said inner layer via a winding device movable back and forth parallel in relation to a longitudinal axis of said rotating core, wherein said thread is applied as a continuous thread running back and forth around the body in the form of a steep helix, forming a plurality of layers of plies of thread with a crossed arrangement from layer to layer, and wherein said thread is arranged substantially parallel within a single layer of said plies of thread;
   iii) mixing at least two reactive liquid or pasty components and forming a reaction mixture in a molding head;
   iv) applying a reaction mixture via said molding head to said inner layer and said thread to form a strength supporter, wherein said molding head is movable back and forth parallel in relation to a longitudinal axis of said rotating core, and wherein said reaction mixture is incorporated with said thread when a reaction degree of said reaction mixture is less than or equal to 50% based on the start of said mixing process in said molding head; and
   v) covering said strength supporter with an outer layer made of elastomeric material.

2. The method according to claim 1, wherein in the step of mixing at least two reactive components, said at least two reactive components are a polyol and a polyisocyanate, which form a polyurethane when mixed.

3. The method according to claim 1, wherein in said step of applying said reaction mixture, said reaction mixture is incorporated at a degree of reaction of not more than 35%.

4. The method according to claim 1 further comprising a step of forming said inner layer and said outer layer as a spiral.

5. The method according to claim 1 further comprising a step of arranging an outlet opening of said molding head so that said reaction mixture is applied within an upper one-third zone of said rotating core based on its total height.

6. The method according to claim 1, further comprising steps of employing a mandrel as said rotating core, and removing said mandrel after the rotationally symmetric body or hose has been completed.

7. The method according to claim 1, further comprising a step of using a pre-fabricated rotationally symmetric body made of elastomeric material with an embedded strength supporter as the rotating core, wherein said rotationally symmetric body attains an outer skin, comprising an inner layer, a strength supporter as well as an outer layer.

8. The method according to claim 1, wherein in the step of applying said reaction mixture said molding head moves as a separate component of the machine synchronously with said thread device, wherein said thread is guided directly above said molding head, and wherein said thread first runs up dry on said inner layer and is then incorporated into said reaction mixture.

9. The method according to claim 1, wherein in the step of applying said reaction mixture, said molding head is integrated with a thread guidance device.

* * * * *